March 10, 1942.  B. STELZER  2,275,697
HYDRAULIC BRAKE BOOSTER
Filed June 13, 1941
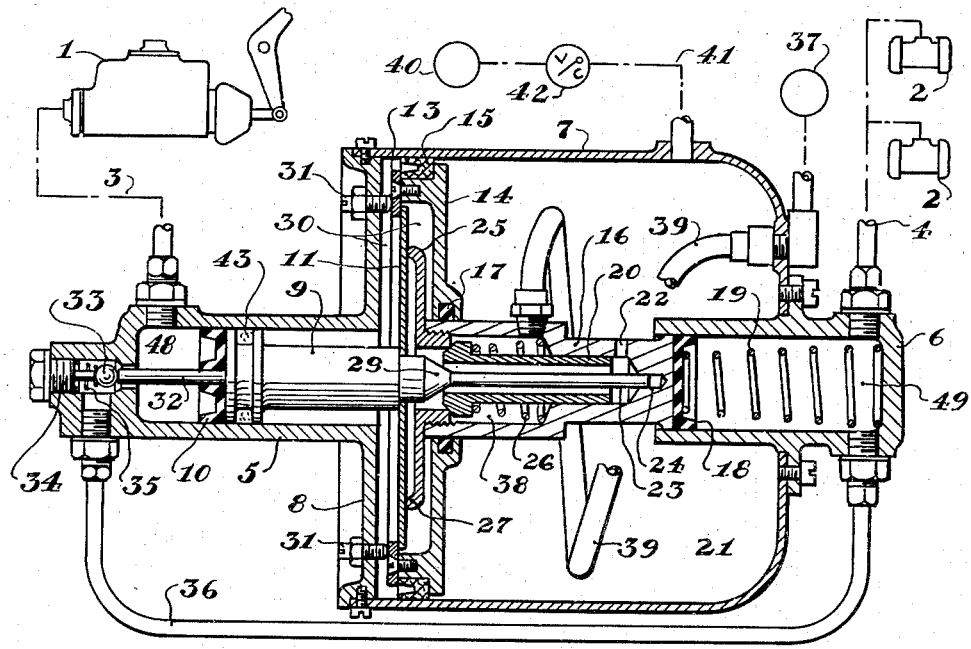
Fig. 1
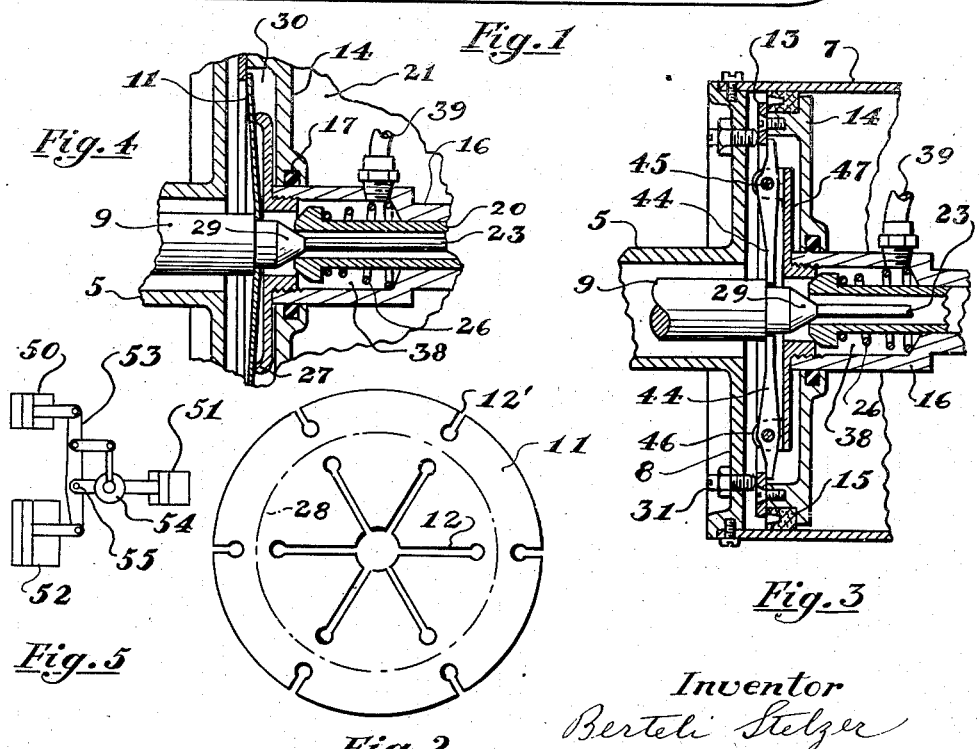
Fig. 4
Fig. 5
Fig. 2
Fig. 3
Inventor
Berteli Stelzer Patented Mar. 10, 1942

2,275,697

UNITED STATES PATENT OFFICE 2,275,697

HYDRAULIC BRAKE BOOSTER

Berteli Stelzer, St. Petersburg, Fla., assignor to William Stelzer, Detroit, Mich.

Application June 13, 1941, Serial No. 397,889

7 Claims. (Cl. 188—152)

The invention relates to hydraulic brake boosters, and more particularly to a brake booster where a primary pressure is produced with a conventional master cylinder operated by the operator, and the primary pressure thus produced is used, together with the help of a power operated expansible motor mechanism, to produce a secondary pressure, and where the mechanical forces which produce the secondary pressure are used to govern the amount of power applied to obtain a boosted hydraulic pressure which is in proportion to the manual effort. The invention is somewhat related to the disclosures shown in the following applications: Ser. No. 281,375 filed June 27, 1939; Ser. No. 308,367 filed December 9, 1939; Ser. No. 303,837 filed November 10, 1939.

The object of the invention is to produce a novel booster which may be mounted anywhere on the vehicle independent of the brake pedal or master cylinder location, and where all external mechanical operating connections as well as hydraulic or air pressure control cylinders are eliminated.

Another object is to simplify the construction so that conventional master cylinder seals may be used, and this is made possible by a novel principle where the mechanical forces transmitted to the secondary cylinder are used to control the power applied to the booster, so that the hydraulic pressure in the wheel cylinders is a predetermined multiple of the hydraulic pressure in the master cylinder, in order to have the feel of the brakes.

A further aim is to obtain a novel construction that lends itself to a simplification in design where the booster is a self-contained unit and where the number of parts may be reduced to a minimum.

Other advantages will appear by inspection of the drawing, wherein:

Fig. 1 is a cross section through the booster connected to a conventional braking system which is shown diagrammatically;

Fig. 2, a detail view of the balancing lever means, carried out as a disc with radial slots to facilitate dishing;

Fig. 3, a modification of the construction shown in Fig. 1, where instead of the disc illustrated in Fig. 2 a plurality of balancing levers is used;

Fig. 4, a fractional view showing a cross section through the valve mechanism as in Fig. 1, except that it is in the "open" position where the valve means direct power to the expansible motor mechanism; and Fig. 5, a diagram to illustrate the principle of the invention.

Describing the invention now more in detail, and referring in particular to Fig. 1, there is shown a conventional brake system having a master cylinder 1 and a plurality of wheel cylinders 2. The novel hydraulic brake booster is interposed in the hydraulic brake line whereby the line 3 leads from the booster to the master cylinder 1, and the line 4 leads from the booster to the wheel cylinders 2. In this preferred embodiment the booster is a self-contained single unit, having a primary or low pressure cylinder 5, a secondary or high pressure cylinder 6, and a power cylinder 7, which are co-axial and secured together to form one rigid piece to house the pistons, valve means, and other elements that are required for the proper function of the booster. The primary cylinder 5, which has a flange 8 to form an end plate for the power cylinder 7, is adapted to receive a piston 9 equipped with a piston seal 10 and having a shoulder to engage the balancing disc 11. This disc is shown more in detail in Fig. 2 and performs the same function as a plurality of levers as shown in Fig. 3. It has radial slots 12 and 12' which reduce the resistance to dishing of the disc. The annular surface near the outer periphery of the disc 11 is in contact with a ring 13 which is secured to the power piston 14 adapted to move in the power cylinder 7. This power piston 14 is provided with a piston seal 15, and has a central bore through which the piston 16 may slide, whereby seal 17 serves to prevent the passage of air. One end of the piston 16 is provided with a hydraulic seal 18 to slide in the secondary cylinder 6 and is urged into the "off" position, as shown in Fig. 1, by a coil spring 19. The opposite end of piston 16 is adapted to house a slidable valve plunger 20 having a central bore in communication with the vacuum chamber 21 through passage 22. This bore also provides room for the guide pin 23 extending from the primary piston 9 and slidably centering in the secondary piston 16 at 24. The valve plunger 20 is retained by a circular plate 25 whose central portion is provided with a thread engaging the piston 16 and serves as a valve seat for the valve plunger 20, which latter is urged against it by means of a coil spring 26. The disc or plate 25 has an annular bead 27 contacting disc or lever plate 11, whereby the point of contact is the center of the fulcrum of the lever. The plate 11 may be considered as an infinite number of levers, each of which has one end in contact with piston 9 and the other end with the power piston 14 through the medium of ring 13, and an intermediate point is in contact with the secondary piston 16 through the medium of plate 25, whereby the intermediate point of contact is on line 28, Fig. 2. The piston 9 has a conical surface 29 which serves as a valve head to seat in the bore of the valve plunger 20. In the "off" position the valve head 29 leaves the passage open so that there is a low pressure or vacuum in chamber 30 as well as in chamber 21, i. e., on both sides of the power cylinder piston. In order to control the opening of the vacuum valve 29 I provide adjustable stop screws 31 which control the location of the power piston 14 in the "off" position. The retractable movement of the primary piston, and with it the valve head 29, is limited by an extension 32 which serves to crack open check valve 33 against a stop 34. The ball of the check valve 33 is urged against its seat in the primary cylinder by a very light coil spring 35. A hydraulic conduit 36 between the primary cylinder and the secondary cylinder provides hydraulic communication between the primary hydraulic pressure level and the secondary hydraulic pressure level when the check valve is open. As a source of power to operate the power cylinder, I use a source of fluid pressure. In the majority of automotive vehicles it is most practical to employ the atmospheric pressure and the vacuum produced in the intake manifold of an internal combustion engine. In such an application the pressure connection of the booster would be open to the atmosphere through an air cleaner 37. The atmospheric pressure is communicated to chamber 38 through the medium of a flexible hose 39. The low pressure side, which is chamber 21, would be connected to the intake manifold or other source of vacuum or suction 40 through tube 41 and check valve 42. The purpose of the latter is to prevent air or gas from entering into chamber 21, whereby the latter serves as a reservoir so that several brake applications can be made even though the engine is not in operation. In principle, the chamber 38 is connected to a source of lower pressure. Thus 37 may represent a source of higher pressure such as an air pump or a supply of compressed gases, and chamber 21 may then be open to the atmosphere, whereby 40 would represent an air cleaner.

In order to prevent piston seal 10 from coming into contact with a dry cylinder wall during operation, which would destroy it in a short time, I provide a packing 43, preferably of felt saturated with brake fluid, in a groove provided in piston 9. This precaution is not necessary in the secondary piston, because in operation the piston moves towards a wetted surface.

In the modified construction shown in Fig. 3 the balancing disc 11 is replaced by a plurality of balancing levers 44 pivoted at 45 on pins which are supported on brackets or bosses 46 extending from plate 47 which takes the place of plate 25. This arrangement is more illustrative of the principle of the invention. All other parts of the brake system are identical to those shown in Fig. 1. To prevent cocking of piston 14 in the power cylinder, it is preferable to use at least three equi-distanced balancing levers 44. In the illustration an arrangement of four is intended. One of the levers may be considered hidden behind primary piston 9.

In Fig. 5 I show the major elements diagrammatically in a fundamental arrangement to illustrate the principle of the invention. 50 denotes the primary cylinder, 51 the secondary cylinder, and 52 the power cylinder, which are all in fixed relation. 53 denotes the balancing means or lever, and 54 the valve. The pivot point 55 is representative of line 28 or pivot point 45. It is apparent that a relative movement between the piston in the primary cylinder 50 and the piston in the power cylinder causes operation of the valve 54.

Describing now the operation of the novel braking system, it is assumed that the booster is in the "off" position, as shown in Fig. 1. To simplify the description, I divide the hydraulic circuit of the system into a primary circuit or low pressure circuit, and a secondary circuit or high pressure circuit. The primary circuit consists of the hydraulic fluid put under pressure directly by the master cylinder, or comprising the master cylinder, line 3, and chamber 48 of the primary cylinder, and the secondary circuit consists of the hydraulic fluid put under pressure by the booster mechanism, or comprising chamber 49 of the secondary cylinder, line 4, and wheel cylinders 2.

Assuming that the primary and the secondary circuits are completely filled with brake fluid, and that the operator now depresses the brake pedal to apply the brakes, a hydraulic pressure is produced in the master cylinder which is communicated through line 3 to chamber 48, and through the open check valve 33 and line 36 to chamber 49 and the wheel cylinders 2 which thereby expand to engage the brake shoes with the brake drums. Thus the height of the primary pressure level and that of the secondary pressure level are yet the same. The effort to expand the brake shoes until they come in contact with the drums is comparatively small; therefore, the hydraulic pressure is yet at a low level. However, it may be sufficient to move piston 9 until the valve head 29 seats on plunger 20, but spring 26 is of sufficient strength to resist further movement. This valve action as yet has no effect on the operation of the expansible motor mechanism. The work required to expand the brake shoes is performed solely by manual effort. The hydraulic fluid is still able to flow from the master cylinder to the wheel cylinders as the check valve permits flow in this direction even though extension 32 is released from the ball.

After the brake shoes come into contact with the brake drums, and the operator depresses the foot pedal further, the resistance, and with it the hydraulic pressure, increases; spring 26 thereby yields and permits opening of the valve which directs power to the expansible motor mechanism, i. e., plunger 20 is unseated from plate 25, allowing air to pass from the atmosphere through hose connection 39, chamber 38, into chamber 30 to move the power piston, as shown in Fig. 4. Before this happens, or while the valve is being opened, disc 11 is being dished similarly to a "Belleville" washer. The outer periphery of the balancing disc 11 remains stationary because piston 14 rests against stop screws 31; therefore, piston 16 is moved in the same direction as piston 9, only a smaller distance. The ratio of this movement is the same as the booster ratio, which is equal to the radial distance on disc 11 between the point of contact of piston 9 and that of ring 13 divided by the radial distance between line 28 and the point of contact of ring 13. In the embodiment shown the booster ratio is approximately 1:3, and should vary according to application of the invention, increasing with the size of the vehicle.

After power has been directed to the expansible motor mechanism, the power piston 14 and primary piston 9 move in the same direction, while the operator continues to depress the brake pedal whereby the primary piston is doing (in this example) one-third of the work and the expansible motor mechanism is doing two-thirds. The pressure in the secondary circuit is now three times that in the primary circuit, and check valve 33 is closed. The action of the balancing disc 11 is to maintain the proportion of the primary pressure to the secondary pressure by regulating the supply of power to the expansible motor mechanism by means of the valves. Thus as soon as enough air has been admitted to chamber 30, and pistons 9 and 14 are therefore balanced (the opposing forces of piston 9 and piston 14 acting on fulcrum point 27 balancing each other so that one opposes, but not overpowers the other), spring 26 immediately closes the valve 20, causing a relative movement between piston 9 and piston 16 by pushing piston 9 away from piston 16 until valve 20 is seated on 25 and shuts off the further supply of air. If too much air has been directed to chamber 30, piston 14 overpowers piston 9, causing piston 9 to move away from piston 16 whereby valve 20 is seated on 25; valve head 29 unseats; and air is permitted to escape from chamber 30 through the central bore of plunger 20 into chamber 21, and from there into the intake manifold 40 or other source of low pressure, until the equilibrium is established again.

Upon the retractile movement of the brake pedal, when the operator releases it, the pressure in the primary circuit drops suddenly, and the primary piston 9 is overpowered immediately, causing it to move away from piston 16 whereby valve 29 unseats and plunger 20 is closed so that the air in chamber 30 is allowed to escape into chamber 21 until the pressures on both sides of the power piston 14 are equalized and the pistons 16, 9, and 14 are allowed to return to the "off" position, urged by spring 19 and the hydraulic pressure in the secondary circuit. In the "off" position the check valve 33 is cracked open again by extension 32 and the hydraulic fluid is permitted to return to the master cylinder, whereby the same hydraulic pressure exists again in the primary and in the secondary circuit.

The construction shown on the drawing was designed primarily to illustrate the principle of the invention and to show the necessary elements in one form, there being a primary cylinder 5 which converts the primary hydraulic pressure of the master cylinder into a mechanical force, an expansible motor mechanism or power means consisting of a cylinder 7 and a piston 14 to produce a mechanical force to boost the secondary hydraulic pressure, a secondary cylinder 6 using the mechanical force produced by the primary cylinder and the mechanical force produced by the expansible motor mechanism to produce a secondary pressure to operate the wheel cylinders 2, valve means consisting of a plunger 20, a seat on disc 25, and a valve head 29 to direct power to and from the expansible motor mechanism, and balancing means, or balancing levers 11 or 44 responsive to the mechanical forces produced by the hydraulic pistons 9 and 16 and the power piston 14. Obviously, the mechanical forces produced by the primary piston and the power cylinder piston act in unison to move the secondary piston and are therefore opposed by the reaction of the latter. This may be best understood by inspection of Fig. 5. It is apparent that the various mechanical forces are in a pre-determined relation to each other. The proportion of the force produced by the piston in the primary cylinder 50 to that of the piston in the power cylinder 52 depends on the length of the lever arms of the balancing beam 53, and the reaction of the piston in the secondary cylinder 51 is equal to the sum of the mechanical forces of the primary piston and the power cylinder piston.

Although the invention has been described in connection with a specific embodiment, the principles involved are susceptible to numerous other applications which will readily occur to persons skilled in the art; therefore, I do not wish to be limited to the shown embodiments or otherwise than by the terms of the appended claims.

I claim:

1. In a hydraulic braking system for an automotive vehicle having wheel cylinders to apply the brakes, a master cylinder operated by the operator to produce a primary pressure, a hydraulic booster, said booster having a primary hydraulic cylinder with a piston therein responsive to the hydraulic pressure in said master cylinder, and a secondary cylinder with a piston therein to produce a secondary hydraulic pressure for the wheel cylinders, means to transmit the mechanical reaction force of the piston in the primary cylinder to the piston in the secondary cylinder to produce a hydraulic pressure in said secondary cylinder, an expansible motor mechanism adapted to act on said piston in said secondary cylinder to increase the hydraulic pressure therein, a source of power to operate said expansible motor mechanism, valve means responsive to the mechanical force transmitted from the piston in said primary cylinder to the piston in said secondary cylinder, and to the mechanical force transmitted from said expansible motor mechanism to said secondary piston to direct power to said expansible motor mechanism to boost the secondary pressure in a pre-determined proportion to the primary pressure, fluid pressure transmitting means from said master cylinder to said primary cylinder and from said secondary cylinder to said wheel cylinders, and fluid pressure transmitting means between said primary cylinder and said secondary cylinder with means interposed to prevent passage of fluid from said secondary cylinder to said primary cylinder except in the "off" position.

2. In a hydraulic braking system for an automotive vehicle having wheel cylinders to apply the brakes, a master cylinder operated by the operator, a hydraulic brake booster having a primary hydraulic cylinder in communication with said master cylinder and a secondary hydraulic cylinder in communication with said wheel cylinders, pistons in said cylinders, an expansible motor mechanism adapted to exert a force on the piston in said secondary cylinder, a source of power to operate said expansible motor mechanism, said piston in said primary cylinder being adapted to convert the hydraulic pressure into a mechanical force, means to transmit the latter to the piston in said secondary cylinder, valve means responsive to said mechanical force produced by the piston in said primary cylinder and the force produced by said expansible motor mechanism to direct power to said expansible motor mechanism to operate the latter to boost the wheel cylinder hydraulic pressure to a predetermined multiple of the master cylinder hydraulic pressure, and fluid transmitting means between said primary cylinder and said secondary cylinder to establish communication when said booster is in the "off" position.

3. In a hydraulic braking system for an automotive vehicle having wheel cylinders to apply the brakes, a master cylinder operated by the operator to produce a primary pressure, a hydraulic brake booster having a primary hydraulic cylinder in communication with said master cylinder, and a secondary hydraulic cylinder in communication with said wheel cylinders to produce a secondary pressure, a piston in said secondary cylinder, a piston in said primary cylinder, an expansible motor mechanism arranged to act on said piston in said secondary cylinder to boost the secondary hydraulic pressure, mechanical pressure transmitting means to transmit the force produced by the primary hydraulic pressure on the piston in said primary cylinder to the piston in said secondary cylinder to boost the secondary hydraulic pressure, valve means responsive to said mechanical forces acting on said piston in said secondary cylinder to direct power to and from said expansible motor mechanism, whereby the mechanical force produced by the primary hydraulic pressure urges to cause an increase in the effort of said expansible motor mechanism and the mechanical force transmitted from said expansible motor mechanism to said piston in said secondary cylinder urges to cause a decrease in the effort of said expansible motor mechanism, and means to establish a hydraulic communication between said primary pressure and said secondary pressure when said booster is in the "off" position.

4. In a hydraulic braking system for a vehicle having wheel cylinders to apply the brakes, a master cylinder operated by the operator to produce a primary pressure, a hydraulic brake booster having a primary hydraulic cylinder in communication with said master cylinder, and a secondary hydraulic cylinder in communication with said wheel cylinders to produce a secondary pressure, a piston in said primary cylinder, a piston in said secondary cylinder, an expansible motor mechanism, a source of power for said expansible motor mechanism, balancing lever means on the principle of a lever on one end of which the primary cylinder piston is acting and on the other end of which said expansible motor mechanism is acting, and whereby the fulcrum at an intermediate position acts on said secondary cylinder piston so that the combined forces of said primary cylinder piston and said expansible motor mechanism are transmitted to said piston in said secondary cylinder to produce a secondary pressure, valve means responsive to the excursions of said balancing lever to direct power to and from said expansible motor mechanism, whereby an excursion caused by the yielding of said primary cylinder piston urges said valve means to cause said expansible motor mechanism to reduce its effort, and whereby an excursion caused by the yielding of said expansible motor mechanism urges said valve means to cause said expansible motor mechanism to increase its effort, in order to produce a secondary pressure which is a pre-determined multiple of the primary pressure, and means to establish communication between said secondary pressure and said primary pressure when said booster is in the "off" position.

5. The construction as claimed in claim 2 where said hydraulic brake booster, said expansible motor mechanism, said means to transmit the mechanical force to the secondary cylinder piston, and said valve means, form a single, self-contained unit, connected to the rest of the braking system with fluid pressure lines.

6. The construction as claimed in claim 4, where said lever means consists of a disc perforated radially to facilitate dishing, where the surface near the periphery is in contact with the power means, and the surface near the center of said disc is engaged by said primary piston.

7. The construction as claimed in claim 4, where said lever means consists of a disc where the surface near the periphery is in contact with the power means, and the surface near the center of said disc is engaged by said primary piston.

BERTELI STELZER